United States Patent
Harandi et al.

(10) Patent No.: US 11,591,527 B2
(45) Date of Patent: Feb. 28, 2023

(54) PROCESSES FOR PRODUCING HIGH OCTANE REFORMATE HAVING HIGH $C_{5+}$ YIELD

(71) Applicant: ExxonMobil Technology and Engineering Company, Annandale, NJ (US)

(72) Inventors: Mohsen N. Harandi, New Hope, PA (US); Yira Y. Aponte Torrealba, Sarnia (CA)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 16/943,513

(22) Filed: Jul. 30, 2020

(65) Prior Publication Data

US 2021/0115342 A1   Apr. 22, 2021

Related U.S. Application Data

(60) Provisional application No. 62/924,415, filed on Oct. 22, 2019.

(51) Int. Cl.
   *C10G 35/095* (2006.01)
   *B01J 29/40* (2006.01)

(52) U.S. Cl.
   CPC ............ *C10G 35/095* (2013.01); *B01J 29/40* (2013.01); *C10G 2300/1044* (2013.01); *C10G 2300/1081* (2013.01); *C10G 2300/202* (2013.01); *C10G 2300/305* (2013.01); *C10G 2300/308* (2013.01); *C10G 2300/4006* (2013.01); *C10G 2300/4012* (2013.01); *C10G 2300/4018* (2013.01); *C10G 2300/70* (2013.01); *C10G 2400/20* (2013.01); *C10G 2400/30* (2013.01)

(58) Field of Classification Search
   CPC .......... C10G 35/095; C10G 2300/1044; C10G 2300/1081; C10G 2300/202; C10G 2300/305; C10G 2300/308; C10G 2300/4006; C10G 2300/4012; C10G 2300/4018; C10G 2300/70; C10G 2400/20; C10G 2400/30; B01J 29/40
   See application file for complete search history.

(56) References Cited

U.S. PATENT DOCUMENTS

| | | |
|---|---|---|
| 3,354,078 A | 11/1967 | Miale |
| 3,702,886 A | 11/1972 | Argauer |
| 3,709,979 A | 1/1973 | Chu |
| 3,759,821 A | 9/1973 | Brennan |
| 3,832,449 A | 8/1974 | Rosinski et al. |
| 4,016,218 A | 4/1977 | Haag et al. |
| 4,016,245 A | 4/1977 | Plank et al. |
| 4,062,762 A | 12/1977 | Howard et al. |
| 4,076,842 A | 2/1978 | Plank et al. |
| 4,375,573 A | 3/1983 | Young |
| 4,556,477 A | 12/1985 | Dwyer |
| 4,788,364 A | 11/1988 | Harandi |
| 4,827,069 A | 5/1989 | Kushnerick et al. |
| 4,954,325 A | 9/1990 | Rubin et al. |
| 4,992,607 A | 2/1991 | Harandi et al. |
| 5,043,499 A | 8/1991 | Harandi et al. |
| 5,236,575 A | 8/1993 | Bennett et al. |
| 5,362,697 A | 11/1994 | Fung et al. |
| 5,482,617 A | 1/1996 | Collins et al. |
| 5,599,439 A | 2/1997 | Collins et al. |
| 5,600,048 A | 2/1997 | Cheng et al. |
| 2007/0038010 A1* | 2/2007 | Xie .................... C07C 11/02 585/651 |
| 2008/0035527 A1* | 2/2008 | Eng .................... C10G 11/182 208/113 |
| 2016/0264492 A1 | 9/2016 | Smalley et al. |

* cited by examiner

*Primary Examiner* — Thuan D Dang

(74) *Attorney, Agent, or Firm* — Shook, Hardy & Bacon L.L.P.

(57) ABSTRACT

Provided are novel process for upgrading naphtha and increasing the yield of reformate. Olefinic naphtha and light paraffins are combined and fed to a catalytic fluidized bed reactor maintained at a temperature about 775° F. and about 1250° F. and an operating pressure between about 10 psig and about 500 psig to produce a product comprising at least 1 wt. % higher $C_{5+}$ hydrocarbon than the combined feed and at least 55 wt. % aromatics.

23 Claims, No Drawings

PROCESSES FOR PRODUCING HIGH OCTANE REFORMATE HAVING HIGH $C_{5+}$ YIELD

FIELD OF THE INVENTION

The present invention relates to reforming naphtha to improve octane rating, and more particularly relates to upgrading naphtha to improve octane rating and $C_{5+}$ hydrocarbon yield.

BACKGROUND OF THE INVENTION

Naphtha, $C_{5+}$ hydrocarbon, can be isolated from numerous sources such as fluid catalytic cracking ("FCC"), steam cracking, coker units, and other olefinic naphtha processes. Without further treatment, cracked naphtha has a high-octane rating as a result of olefinic components. Environmental requirements demand cleaner burning, less polluting fuels, especially low sulfur fuels. Hydrotreating of sulfur containing fractions, however, causes a reduction in the olefin content, and consequently a reduction in the octane number. As the degree of desulfurization increases, the octane number of the normally liquid gasoline boiling range product decreases. Increasing aromatics can be a source of a high-octane rating. As such aromatics are desirable components of a gasoline pool. But aromatics, particularly benzene, have been the subject of severe limitations as a gasoline component to the adverse effects on the ecology.

Various combinations of fractionating and other treatments have been proposed to improve the octane rating of naphtha, including catalytic reforming. Catalytic reforming increases the octane rating of naphtha by converting at least a portion of the paraffins and cycloparaffins to aromatics. In addition, catalytic reforming processes have been proposed to upgrade naphtha with low levels of aromatics while retaining a reasonably high-octane rating. These prior art reforming processes often result in significant loss of $C_{5+}$ hydrocarbon in the product stream. In an effort to address the yield loss, combinations of different processes have been proposed to limit the loss in $C_{5+}$ yield. However, such processes typically require multiple units and are expensive to operate, and still sustain a certain level of loss of the $C_{5+}$ yield. Moreover, before reforming naphtha, the fractions often require desulfurization because the catalysts utilized are typically not sulfur tolerant and/or the catalysts have to be pretreated (hydrotreated) to reduce sulfur content.

For decades in refining, octane gain and aromatics production have been accompanied with significant $C_{5+}$ gasoline yield loss. For example, reforming cracks about 10 to 20 percent of the naphtha feed processed to lighter hydrocarbons than $C_{5+}$ gasoline. This represents a huge economical loss, typically at least about $10/BBL.

A need exists, therefore, for reforming processes to upgrade naphtha to a high-octane product while improving the yield of $C_{5+}$ hydrocarbon.

SUMMARY OF THE INVENTION

Provided herein is a process for increasing yield of reformate comprising the step of cofeeding olefinic naphtha and light paraffins to a catalytic fluidized bed reactor maintained at a temperature between about 775° F. and about 1250° F. and an operating pressure between about 10 psig and about 500 psig to produce a product comprising at least 1 wt. % $C_{5+}$ hydrocarbon more than the amount of $C_{5+}$ hydrocarbon in the cofeed and at least 55 wt. % aromatics.

Further provided are processes for upgrading naphtha comprising the step of providing a combined feed to a catalytic fluidized bed reactor to yield a product. The combined feed comprises $C_{5+}$ hydrocarbon in an amount between about 40 wt. % and about 60 wt. % and light paraffins in an amount between about 30 wt. % and 50 wt. %. The catalytic fluidized bed reactor has an operating temperature between about 775° F. and about 1250° F. and an operating pressure between about 10 psig and about 500 psig. The product can comprise about 50 wt. % to 70 wt. % $C_{5+}$ hydrocarbon, between about 20 wt. % and about 30 wt. % paraffinic product, and less than 2 wt. % of olefinic product. In an aspect, in the product, the $C_{5+}$ hydrocarbon comprises at least 55 wt. % aromatics. In an aspect, the combined feed comprises a first feed comprising light paraffins and a second feed comprising olefinic naphtha.

In an aspect, the olefinic naphtha comprises $C_4$ to $C_{12}$ hydrocarbons. The light paraffins comprise $C_2$ to $C_5$ hydrocarbons. In an aspect, the product further comprises less than 1.0 wt. % coke. In an aspect, the product further comprises less than 3.0 wt. % $C_{2-}$ hydrocarbons. In an aspect, the product further comprises between about 15 wt. % and about 20 wt. % saturated hydrocarbons. In an aspect, the product further comprises less than 10 wt. % iso-paraffin and naphthene. In an aspect, the product further comprises less than 5.0 wt. % light paraffins.

In an aspect, the reactor further comprises between about 0.5 wt. % and about 5 wt. % unsaturated hydrocarbons. In an aspect, the reactor has an operating pressure between about 150 psig and about 300 psig. In an aspect, the reactor has an operating temperature between about 850° F. and about 1000° F. In an aspect, the aromatics comprise benzene, toluene, and xylene. In an aspect, the catalytic fluidized bed reactor comprises a zeolite catalyst. In an aspect, the olefinic naphtha is fed to the reactor at a hydrocarbon weight hourly space velocity (HC WHSV) between about 3.0 hr$^{-1}$ and about 5.0 hr$^{-1}$. In an aspect, the product has a RON of 100 or greater. The product has a specific gravity between about 0.795 and about 0.800. In an aspect, the product has a sulfur content less than about 50 wppm. In an aspect, the olefinic naphtha is isolated from an FCC process, a coker process, or a steam cracking process. In an aspect, virgin naphtha is upgraded a catalytic fluidized bed reactor to high octane gasoline component. In an aspect, the product is separated to recover aromatics for petrochemical use such as benzene, toluene, xylenes, paraxylene, and meta xylene and/or for use as solvents.

DETAILED DESCRIPTION OF THE INVENTION

Before the present compounds, components, compositions, and/or methods are disclosed and described, it is to be understood that unless otherwise indicated this disclosure is not limited to specific compounds, components, compositions, reactants, reaction conditions, ligands, catalyst structures, metallocene structures, or the like, as such can vary, unless otherwise specified. It is also to be understood that the terminology used herein is for the purpose of describing particular embodiments only and is not intended to be limiting.

All numerical values within the detailed description and the claims herein are modified by "about" or "approximately" the indicated value, taking into account experimental error and variations.

For the sake of brevity, only certain ranges are explicitly disclosed herein. However, ranges from any lower limit can be combined with any upper limit to recite a range not explicitly recited, as well as, ranges from any lower limit can be combined with any other lower limit to recite a range not explicitly recited, in the same way, ranges from any upper limit can be combined with any other upper limit to recite a range not explicitly recited. Additionally, within a range includes every point or individual value between its end points even though not explicitly recited. Thus, every point or individual value can serve as its own lower or upper limit combined with any other point or individual value or any other lower or upper limit, to recite a range not explicitly recited.

For the purposes of this disclosure, the following definitions will apply:

As used herein, the terms "a" and "the" as used herein are understood to encompass the plural as well as the singular.

The term "$C_n$" hydrocarbon (olefinic naphtha or paraffin) wherein n is a positive integer, e.g., 1, 2, 3, 4, 5, . . . , refers to a hydrocarbon having n number of carbon atom(s) per molecule.

The term "$C_{n+}$" hydrocarbon wherein n is a positive integer, e.g., 1, 2, 3, 4, 5, . . . , refers to a hydrocarbon having at least n number of carbon atom(s) per molecule.

The term "$C_{n-}$" hydrocarbon wherein n is a positive integer, e.g., 1, 2, 3, 4, 5, . . . , as used herein, refers to a hydrocarbon having no more than n number of carbon atom(s) per molecule.

As used herein, the term "Constraint Index" or "CI" is an approximate measure of a catalyst's ability to allow molecules of varying sizes to access the catalyst's internal structure. Catalysts with higher CI values are more constrained; that is, it is more difficult for molecules to access the internal structure of a catalyst with high CI than for a catalyst with low CI. Zeolite catalysts typically have CI values ranging from about 1 to about 12. The method by which CI is determined is described in U.S. Pat. No. 4,016,218 Col. 3 1. 31-64, incorporated herein by reference.

As used herein, the term "gasoline" or "gasoline boiling range hydrocarbons" refers to a composition comprising predominantly $C_5$-$C_{12}$ hydrocarbons.

As used herein, the term "gasoline boiling range components" refers to a composition comprising at least predominantly $C_5$-$C_{12}$ hydrocarbons and having a boiling range between about 100° F. and about 425° F. and meeting ASTM standard D439 alone or when blended with other gasoline components.

As used herein, the term "Weight Hourly Space Velocity" or "WHSV" refers to the mass flow rate of a feed stream divided by the weight of catalyst present in a reactor. WHSV has units of $hr^{-1}$. More particularly, the term "Hydrocarbon Weight Hourly Space Velocity" ("HC WHSV") refers to the mass flow rate of a feed stream comprising hydrocarbons divided by the weight of catalyst present in the catalytic reactor.

As used herein, the term "Liquid Hourly Space Velocity" or "LHSV" refers to the volumetric flow rate of a liquid feed stream divided by the volume of catalyst present in a reactor. LHSV has units of $hr^{-1}$.

As used herein, the term "octane number" refers to the percentage of iso-octane in a mixture of iso-octane and n-heptane that would have the same knock resistance as the presently tested fuel, according to ASTM D2699 and D2700. Octane numbers typically range from 0 to 100, with higher values indicating better fuel performance. Octane numbers are unitless.

The term "Research Octane Number," or "RON" refers to the octane number obtained by testing at lower engine speed and temperature, typically about 600 rpm, according to ASTM D2699.

The term "Motor Octane Number" or "MON" refers to the octane number obtained by testing at higher engine speed and temperature, typically about 900 rpm according to ASTM D2700. Given that engine inefficiency inherently increases as temperature increases, RON is typically higher than MON.

As used herein, the term "specific gravity" refers to the ratio of the density of a particular substance to the density of water or a density of 1 $g/cm^3$. Specific gravity is a unitless measure.

As used herein, unless specified otherwise, percent by mole is expressed as "mol. %," and percent by weight is expressed as "wt. %."

As used herein, the term "olefin" refers to a linear, branched, or cyclic compound comprising carbon and hydrogen and having a hydrocarbon chain containing at least one carbon-to-carbon double bond in the structure thereof, where the carbon-to-carbon double bond does not constitute a part of an aromatic ring. The term "olefin" is intended to embrace all structural isomeric forms of olefins, unless it is specified to mean a single isomer or the context clearly indicates otherwise.

In accordance with the present disclosure, provided herein are processes for increasing yield of reformate comprising the step of cofeeding olefinic naphtha and light paraffins to a catalytic fluidized bed reactor maintained at a temperature between about 775° F. and about 1250° F. and an operating pressure between about 50 psig and about 500 psig to produce a product comprising at least about 1 wt. % higher $C_{5+}$ hydrocarbon than the feed/co-feed and comprising at least 55 wt. % aromatics. Unlike conventional Pt catalyzed reforming, the present product comprises at least 1 wt. % less $C_3$-$C_4$ hydrocarbons than present in the cofeed. In addition, conversion of paraffins in the $C_3$-$C_4$ hydrocarbon range can be achieved, for example, 30%, 40% or 70%. Furthermore, endothermic paraffin conversion benefits from the exothermic olefinic naphtha conversion which makes heat balancing the reactor easier.

Further provided are processes for upgrading naphtha comprising the step of providing a combined feed to a catalytic fluidized bed reactor to yield a product. The combined feed comprises $C_{5+}$ hydrocarbon in an amount between about 40 wt. % and about 60 wt. % and light paraffins in an amount between about 30 wt. % and about 50 wt. %. The catalytic fluidized bed reactor has an operating temperature between about 775° F. and about 1250° F. and an operating pressure between about 50 psig and about 500 psig. The product comprises at least about 70 wt. % $C_{5+}$ hydrocarbon, between about 20 wt. % and about 30 wt. % paraffinic product, and less than 2 wt. % of olefinic product. The $C_{5+}$ hydrocarbon comprises at least 65 wt. % aromatics. The combined feed comprises light paraffins and olefinic naphtha. In an aspect, the combined feed comprises an olefinic naphtha feed and a light paraffins feed combined in the catalytic fluidized bed reactor. In an aspect, the olefinic naphtha feed and light paraffins feed are combined and then fed as one feed stream to the catalytic fluidized bed reactor.

Olefinic Naphtha

As used herein, olefinic naphtha comprises $C_{5+}$ hydrocarbon isolated based on boiling point. Olefinic naphtha can be isolated from numerous sources such as fluid catalytic cracking, steam cracking, coker or any other unit/process that produces olefinic naphtha.

The fluid catalytic cracking ("FCC") process has become the pre-eminent source for motor gasoline in the USA and also serves the petrochemical industry with light olefins as petrochemical feedstock. Normal FCC operation cracks large molecules to a wide boiling mixture including olefins (alkenes). The addition of ZSM-5 catalyst can further convert naphtha (gasoline) range olefins into butylene, propylene and ethylene. Olefins exhibit maximum yield as a function of ZSM-5 due to dilution of the normal FCC cracking catalyst.

An FCC catalyst will facilitate hydrogen transfer of an olefin to a corresponding paraffin (e.g., isobutylene to isobutane). As temperature increases, olefin production also increases. At high temperatures, however, over cracking can lead to significant hydrogen transfer and unwanted coke formation. Cracked naphtha, directly produced from the catalytic cracker and without any further treatments, has a relatively high-octane number as a result of the presence of olefinic components. In some cases, this fraction can contribute as much as up to half the gasoline in the refinery pool, together with a significant contribution to product octane ratings. See U.S. Pat. No. 5,599,439.

As described herein, catalytic reforming process are chemical processes used to convert naphtha distilled from crude oil, often having low octane ratings, into high-octane liquid products called reformates. Reformates are blending stocks used for high-octane gasoline. Generally, in a catalytic reforming process, low-octane linear hydrocarbons ("paraffins") are converted into branched alkanes ("isoparaffins") and cyclic compounds are preferentially dehydrogenated to produce high-octane aromatic hydrocarbons. Dehydrogenation can also produce hydrogen gas as a byproduct, which can be recovered and fed into other refinery processes such as hydrocracking. During a reforming process, hydrogenolysis produces light hydrocarbons of lower value such as methane, ethane, propane and butanes. In addition to a gasoline blending stock, reformate can be a source of aromatic bulk chemicals such as benzene, toluene, xylene and ethylbenzene.

Noteworthy, a catalytic reformate process is not the same as a catalytic steam reforming process. Catalytic steam reforming processes are used industrially to produce products such as hydrogen, ammonia, and methanol from natural gas, naphtha or other petroleum-derived feedstocks as well as various other catalytic reforming processes that use methanol or biomass-derived feedstocks to produce hydrogen for fuel cells or other uses.

Generally, in a petroleum refinery, a first unit operation is crude oil distillation. The overhead liquid distillate from a crude oil distillation unit is called virgin or straight-run naphtha, a primary source of naphtha in petroleum refineries. Naphtha is a mixture of many different hydrocarbon compounds. Naphtha has an initial boiling point of about 35° C. and a final boiling point of about 200° C. Naphtha comprises paraffin, naphthene (cyclic paraffins) and aromatic hydrocarbons or hydrocarbons having between 6 carbon atoms and about 10 or 11 carbon atoms.

Virgin naphtha is often further distilled into two streams: light naphtha containing hydrocarbons with five or fewer carbon atoms; and heavy naphtha containing most (but not all) of the hydrocarbons with more than five carbon atoms. Heavy naphtha is typically processed in a catalytic reforming process. Light naphtha typically contains compounds of six or fewer carbon atoms which, when reformed, tend to crack into butane and lower molecular weight hydrocarbons and, therefore, is not used in high-octane gasoline blending. Further, heavy naphtha, derived from various crude oils are available for catalytic reforming, can differ significantly in paraffins, naphthene and aromatic content.

As used herein, cracked naphtha is also referred to as "olefinic naphtha" and comprises olefinic hydrocarbons, such as naphtha derived from the fluid catalytic cracking, visbreakers and coking processes. Cracked naphtha is an intermediate hydrocarbon liquid stream derived from the refining of crude oil with CAS-no 64742-48-9. As described herein, an olefinic naphtha feed is catalytically reformed. In the catalytic reforming process, certain hydrocarbon molecules are rearranged or restructured, and certain compounds are cracked into smaller molecules in order to produce a high-octane gasoline.

There are hundreds of different petroleum crude oil sources worldwide and each crude oil has its own unique composition or assay. There are also hundreds of petroleum refineries worldwide and each of them is designed for a market purpose. Hence, each refinery produces its own olefinic naphtha with particular initial and final boiling points, and other physical and compositional characteristics.

While light and full range naphtha contributes substantial volume to the gasoline pool, naphtha does not generally contribute significantly to higher octane values without reforming. Generally, naphtha is subjected to catalytic reforming to increase the octane number of gasoline and by converting at least a portion of the paraffins and cyclopararaffins to aromatics. Fractions fed to catalytic reforming with a platinum type catalyst are often desulfurized before reforming because reforming catalysts are generally not sulfur tolerant. Therefore, the fraction is often pretreated by hydrotreating to reduce sulfur content before reforming.

The present processes differ from reforming processes previously proposed in that sulfur content can be reduced simultaneously as the octane rating of the $C_{5+}$ hydrocarbon is improved. As such, this process feature (together with other features such as cofeeding olefinic naphtha and light paraffins to the catalytic fluidized bed reactor) serves to distinguish the present processes from prior art/proposed processes that typically require multi-steps processing. For example, one such reforming process is described in U.S. Pat. No. 4,062,762 in which the cracked gasoline is fractionated prior to reforming. In this process, naphtha is desulfurized by fractionating the naphtha into three fractions. Each of the fractions are then desulfurized by a different procedure, after which the fractions are recombined. Another cumbersome process is described in U.S. Pat. No. 3,759,821 where catalytically cracked gasoline is upgraded by fractionating it into a heavier and a lighter fraction and treating the heavier fraction over a ZSM-5 catalyst, after which the treated fraction is blended back into the lighter fraction.

As noted above, hydrotreating of any of the sulfur containing fractions which boil in the gasoline boiling range causes a reduction in the olefin content, and consequently a reduction in the octane number. As the degree of desulfurization increases, the octane number of the normally liquid gasoline boiling range product decreases. See e.g., U.S. Pat. No. 5,599,439. Therefore, if desired, desulfurization of naphtha by hydrotreating can take place prior to the present upgrading processes. However, desulfurization of the cofeed is not a necessary step of the present processes.

Light Paraffins

The light paraffins useful in the processes described herein are also referred to as a light paraffins feed and comprise, in predominant part, $C_2$-$C_5$ paraffins (alkanes), particularly $C_3$ alkanes such as propane, or $C_4$ alkanes such as n-butane. In an aspect, the light paraffin feed comprises less than 90 wt. % $C_2$-$C_5$ paraffins, less than 60 wt. % $C_2$-$C_5$ paraffins, less than 50 wt. % $C_2$-$C_5$ paraffins, or less than 40 wt. % $C_2$-$C_5$ paraffins.

Various light paraffins can be employed in the novel processes described herein. Light paraffins can be fed to the catalytic fluidized bed reactor as a liquified gas, such as liquified ethane, propane, butane, pentane or a mixture thereof. The light paraffins feed can be a natural gas condensate. Other suitable light paraffins feeds include mixed refinery LPG streams. Furthermore, a mixture of the light paraffins feeds can be used in the processes described herein. By way of example, suitable light paraffins feed are described in US Patent Application Publication No. 2016/264492, ¶¶ [0003], & [0006], incorporated herein by reference.

An example of processes to convert light paraffins is described in U.S. Pat. No. 4,788,364 which discloses an improved two-step process for the conversion of lower molecular weight paraffins. In a first step, this process comprises contacting a $C_2$-$C_{10}$ alkane-rich feedstock with a siliceous zeolite catalyst in a fluidized bed reaction zone under high temperature dehydrogenation conditions to obtain an intermediate product comprising olefinic hydrocarbons and aromatics. In a second step, the olefinic hydrocarbons and aromatics are then contacted with a siliceous zeolite catalyst in a secondary fluidized bed reaction zone under low temperature oligomerization conditions to obtain a product comprising gasoline boiling range aliphatic and aromatic hydrocarbons.

Catalytic Fluidized Bed Reactor

In the present processes, the olefinic naphtha feed and the light paraffins feed (also referred to herein as a "feed," a "combined feed," or a "cofeed") can be contacted with a catalyst in a catalytic fluidized bed reactor (also referred to herein as a "fluidized bed reactor") under conversion conditions. Each of the olefinic naphtha feed and the light paraffins feed can be fed to the fluidized bed reactor as separate feed streams or each of the feeds can be combined upstream of the fluidized bed reactor and fed as one stream. The fluidized bed reactor can be a riser reactor.

In an aspect, the fluidized bed reactor comprises a fluidized catalyst bed having a turbulent reaction zone. The cofeed is passed through the turbulent reaction zone at a velocity greater than dense bed transition velocity in a turbulent regime and less than transport velocity for the average catalyst particle. A portion of coked catalyst can be withdrawn from the turbulent reaction zone, oxidatively regenerated and returned to the turbulent reaction zone at a rate sufficient to control catalyst activity. The catalytic fluidized bed reactor provides a continuous conversion of the cofeed comprising olefinic naphtha and light paraffin to $C_{5+}$ hydrocarbon products having high-octane rating. In an aspect, a fluidized catalyst bed is described in U.S. Pat. No. 4,827,069.

Under optimized process conditions and by way of example, the fluidized catalyst bed can have a superficial vapor velocity between about 0.3 meters per second (m/sec) and about 2 m/sec. At higher velocities entrainment of fine particles can become excessive and beyond about 3 m/sec the entire bed can be transported out of the reaction zone. At lower velocities, the formation of large bubbles or gas voids can be detrimental to conversion.

A measure of turbulent fluidization is the bed density. Typically, the fluidized bed has an operating density between about 100 kg/m³ and about 500 kg/m³, or between about 300 kg/m³ and about 500 kg/m³, measured at the bottom of the reaction less dense toward the top of the reaction zone, due to pressure particle size differentiation. This density is generally between the catalyst concentration employed in dense beds and the dispersed transport systems. Pressure differential between two points in the fluidized bed reactor can be measured to obtain the average bed density at such portion of the turbulent reaction zone. For instance, in a fluidized bed system employing ZSM-5 particles having an apparent packed density of 750 kg/m³ and real density of 2430 kg/m³, an average fluidized bed density between about 300 kg/m³ and about 500 kg/m³ is satisfactory.

In addition, operations can be optimized to produce high octane $C_{5+}$ hydrocarbon. Moreover, operating parameters of the catalytic fluidized bed reactor can be set to crack the olefinic naphtha in the cofeed while minimizing the production of $C_{2-}$ hydrocarbons. For example, WHSV and uniformity of contact allow for control of contact time between vapor or vapor and liquid and solid phases, which is typically between about 3 and about 25 seconds.

Several parameters contribute to fluidization in the turbulent reaction zone in accordance with the process of the present invention. When employing a ZSM-5 type zeolite catalyst in fine powder form, such a catalyst should comprise the zeolite suitably bound or impregnated on a suitable support with a solid density (weight of a representative individual particle divided by its apparent "outside" volume) in the range between about 0.6 g/cm³ and about 2 g/cm³, or between about 0.9 g/cm³ and about 1.6 g/cm³. The catalyst particles can have particle sizes up to about 250 microns, with an average particle size between about 20 and 100 microns, or can have particle sizes between about 20 and 150 microns with an average particle size between 40 and 80 microns. When these solid particles are placed in a fluidized bed where the superficial fluid velocity is between about 0.3 m/sec and about 2 m/sec, operation in the turbulent reaction zone is obtained. The velocity specified corresponds to operation at a total reactor pressure between about 0 psig and about 30 psig. At higher pressures, a lower gas velocity can be employed to ensure operation in the turbulent fluidization regime.

The fluidized bed reactor can be made in any technically feasible configuration, but several criteria should be considered. The fluidized catalyst bed can be at least about 5-20 meters in height. Fine particles can be included in the bed, especially due to attrition, and the fine particles can be entrained in a product gas stream. A typical fluidized catalyst bed can have a catalyst carryover rate up to about 1.5 times that of a reaction zone inventory per hour. If the fraction of fine particles becomes large, a portion of the carryover can be removed from the fluidized bed reactor and replaced by larger particles. It is feasible to have a fine particle separator, such as a cyclone and/or filter means, disposed within or outside a reactor shell to recover catalyst carryover and return this fraction continuously to the bottom of the turbulent reaction zone for recirculation at a rate of about one catalyst inventory per hour. Fine particles carried from the fluidized bed reactor entrained with effluent gas can be recovered by a high operating temperature sintered metal filter.

The use of a turbulent reaction zone permits the conversion system to be operated at low pressure drop. An important advantage of the process is the close temperature control that is made possible by turbulent reaction zone operation, wherein uniformity of conversion temperature can be maintained within close tolerances, often less than 25° C. Except for a small zone adjacent a bottom gas inlet, a midpoint measurement is representative of the entire fluidized catalyst bed, due to thorough mixing.

To maximize yield of $C_{5+}$ hydrocarbon, process variables such as reaction temperature, pressure, WHSV, and catalyst activity should be considered. A typical fluidized bed reactor employs a temperature-controlled catalyst zone with indirect heat exchange and/or adjustable feed/catalyst circulation rates and temperatures, whereby a reaction temperature can be carefully controlled within an operating range between about 700° F. and about 1200° F., or at an average reactor temperature between about 850° F. and about 950° F. The reaction temperature can be in part controlled by exchanging hot reactor effluent (product) with the cofeed and/or recycle streams. Optional heat exchangers can recover heat from the product stream prior to fractionation. Part or all of the reaction heat can be removed from the fluidized bed reactor by using cold feed, whereby reactor temperature can be controlled by adjusting feed temperature. To maximize cracking of the olefinic naphtha, if the fluidized bed reactor is also being used to remove sulfur from the cofeed, then the temperature conditions in the fluidized bed reactor are relatively lower than the temperature conditions for a cofeed which has already been desulfurized by hydrotreatment.

Catalyst

In various aspects, the olefinic naphtha feed and the light paraffins feed (also referred to herein as a "combined feed" and/or a "cofeed") can be exposed to a catalyst (such as a zeolite) under effective conversion conditions for olefinic oligomerization and/or sulfur removal. Optionally, the zeolite or other catalyst can also include a hydrogenation functionality, such as a Group VIII metal or other suitable metal that can activate hydrogenation/dehydrogenation reactions. The cofeed is exposed to the catalyst without providing substantial additional hydrogen to the reaction environment. Added hydrogen refers to hydrogen introduced as an input flow to the process, as opposed to any hydrogen that might be generated in-situ during processing. Exposing the cofeed to a catalyst without providing substantial added hydrogen is defined herein as exposing the cofeed to the catalyst in the presence of: (a) less than about 100 SCF/bbl. of added hydrogen, or less than about 50 SCF/bbl.; (b) a partial pressure of less than about 50 psig, or less than about 15 psig of hydrogen; or (c) a combination thereof. In a preferred aspect, no hydrogen is added to the fluidized bed reactor.

The catalyst used in the processes described herein can be a heterogeneous catalyst, such as a zeolite-based catalyst, or the catalyst can be a homogeneous catalyst, such as an acidic catalyst, and the catalyst can comprise an acidic zeolite in combination with a binder or matrix material such as alumina, silica, or silica-alumina, and optionally further in combination with a hydrogenation metal. The catalyst can comprise a medium-pore or large-pore size zeolite, such as ZSM-5, ZSM-11, ZSM-12, ZSM-22, ZSM-23, ZSM-35, ZSM-48, MCM-22, MCM-49, or MCM-56.

The catalyst for the present liquid phase alkylation reaction can comprise a medium- or large-pore size zeolite. Particular examples of acidic solid oxides which can be used to catalyze the alkylation reaction include MCM-22, MCM-36, MCM-49, MCM-56, zeolite Beta, zeolite X, zeolite Y, and mordenite. Of these crystalline materials, MCM-22, MCM-49 and MCM-56 are particularly preferred.

The catalyst for the present vapor phase reaction can comprise a medium- or large-pore size zeolite. Particular examples of acidic solid oxides which can be used to catalyze the transalkylation reaction include MCM-22, ZSM-5, ZSM-11, ZSM-12, ZSM-22, ZSM-23, ZSM-35, ZSM-48 and ZSM-50. Of these crystalline materials, ZSM-5 is particularly preferred. See U.S. Pat. No. 5,600,048.

ZSM-5 is described in U.S. Pat. No. 3,702,886 Col. 2 1. 55 through Col. 4 1. 30 and Col. 6 1. 19 through Col. 7 1. 40, incorporated herein by reference. ZSM-11 is described in U.S. Pat. No. 3,709,979 Col. 2 1. 18 through Col. 7 1. 16, incorporated herein by reference. ZSM-12 is described in U.S. Pat. No. 3,832,449 Col. 1 1. 59 through Col. 3 1. 5 and Col. 4 1. 23 through Col. 7 1. 2, incorporated herein by reference. ZSM-22 is described in U.S. Pat. No. 4,556,477 Col. 3 1. 3-43, Col. 5 1. 42 through Col. 6 1. 19, and Col. 7 1. 45 through Col. 9 1. 21, incorporated herein by reference. ZSM-23 is described in U.S. Pat. No. 4,076,842 Col. 2 1. 40 through Col. 3 1. 14 and Col. 4 1. 52 through Col. 6 1. 7, incorporated herein by reference. ZSM-35 is described in U.S. Pat. No. 4,016,245 Col. 2 1. 52 through Col. 3 1. 41 and Col. 5 1. 63 through Col. 7 1. 19, incorporated herein by reference. ZSM-48 is described in U.S. Pat. No. 4,375,573 Col. 2 1. 25 through Col. 7 1. 7, incorporated herein by reference. MCM-22 is described in U.S. Pat. No. 4,954,325 Col. 2 1. 40 through Col. 6 1. 28, incorporated herein by reference. MCM-49 is described in U.S. Pat. No. 5,236,575 Col. 2 1. 67 through Col. 7 1. 32, incorporated herein by reference. MCM-56 is described in U.S. Pat. No. 5,362,697 Col. 4 1. 33 through Col. 9 1. 33 and U.S. Pat. No. 5,600,048 Col. 91. 15 through Col. 12 1. 51, incorporated herein by reference.

Additionally, or alternately, catalysts based on large pore size framework structures (12-member rings) such as synthetic faujasites, especially zeolite Y, such as in the form of zeolite USY. Zeolite beta can be used as the zeolite component. Other materials of acidic functionality which can be used in the catalyst include the materials identified as MCM-36 and MCM-49. Still other materials include other types of molecular sieves having suitable framework structures, such as silicoaluminophosphates (SAPOs), aluminosilicates having other heteroatoms in the framework structure, such as Ga, Sn, or Zn, or silicoaluminophosphates having other heteroatoms in the framework structure. Mordenite or other solid acid catalysts can also be used as the catalyst.

A convenient measure of the extent to which a zeolite provides control of access to molecules of varying sizes to its internal structure is a Constraint Index (CI) of the zeolite. Zeolites which provide a highly restricted access to and egress from its internal structure have a high value for the Constraint Index, and zeolites of this kind usually have pores of small size, e.g., less than 5 Angstroms. On the other hand, zeolites which provide relatively free access to the internal zeolite structure have a low value for the Constraint Index, and usually pores of large size, e.g., greater than 8 Angstroms. The method by which Constraint Index is determined is described in U.S. Pat. No. 4,016,218 Col. 3 1. 31-64, incorporated herein by reference.

A zeolite which can be used in the present reaction can be a medium- or large-pore size zeolite. This zeolite can have a Constraint Index of 12 or less. Zeolites having a Constraint Index of 2-12 are generally regarded to be medium-pore size zeolites. Zeolites having a Constraint Index of less than 1 are generally regarded to be large-pore size zeolites. Zeolites having a Constraint Index of 1-2 can be regarded as either medium- or large-pore size zeolites.

Constraint Index values for some typical materials are:

| CI (at test temperature) | | |
|---|---|---|
| ZSM-4 | 0.5 | (316° C.) |
| ZSM-5 | 6-8.3 | (371° C.-316° C.) |
| ZSM-11 | 5-8.7 | (371° C.-316° C.) |
| ZSM-12 | 2.3 | (316° C.) |
| ZSM-20 | 0.5 | (371° C.) |
| ZSM-22 | 7.3 | (427° C.) |
| ZSM-23 | 9.1 | (427° C.) |
| ZSM-34 | 50 | (371° C.) |
| ZSM-35 | 4.5 | (454° C.) |
| ZSM-38 | 2 | (510° C.) |
| ZSM-48 | 3.5 | (538° C.) |
| ZSM-50 | 2.1 | (427° C.) |
| TMA Offretite | 3.7 | (316° C.) |
| TEA Mordenite | 0.4 | (316° C.) |
| Mordenite | 0.5 | (316° C.) |
| Clinoptilolite | 3.4 | (510° C.) |
| Mordenite | 0.5 | (316° C.) |
| REY | 0.4 | (316° C.) |
| Amorphous Silica-alumina | 0.6 | (538° C.) |
| Dealuminized Y (Deal Y) | 0.5 | (510° C.) |
| Erionite | 38 | (316° C.) |
| Zeolite Beta | 0.6-2.0 | (316° C.-399° C.) |

The above-described Constraint Index provides a definition of those zeolites which are particularly useful in the present processes. The very nature of this parameter and the recited technique by which it is determined, however, admit of the possibility that a given zeolite can be tested under somewhat different conditions and thereby exhibit different Constraint Indices. Constraint Index seems to vary somewhat with severity of operations (conversion) and the presence or absence of binders. Likewise, other variables, such as crystal size of the zeolite, the presence of occluded contaminants, etc., can affect the Constraint Index. Therefore, it will be appreciated that it can be possible to so select test conditions, e.g., temperature, as to establish more than one value for the Constraint Index of a particular zeolite. This explains the range of Constraint Indices for some zeolites, such as ZSM-5, ZSM-11 and Beta.

It is to be realized that the above CI values typically characterize the specified zeolites, but that such are the cumulative result of several variables useful in the determination and calculation thereof. Thus, for a given zeolite exhibiting a CI value within the range of 1 to 12, depending on the temperature employed during the test method within the range of about 290° C. to about 538° C., with accompanying conversion between 10% and 60%, the CI can vary within the indicated range of 1 to 12. Likewise, other variables such as the crystal size of the zeolite, the presence of possibly occluded contaminants and binders intimately combined with the zeolite can affect the CI. It will accordingly be understood to those skilled in the art that the CI, as utilized herein, while affording a highly useful means for characterizing the zeolites of interest is approximate, taking into consideration the manner of its determination, with the possibility, in some instances, of compounding variable extremes. However, in all instances, at a temperature within the above-specified range of about 290° C. to about 538° C., the CI will have a value for any given zeolite of particular interest herein of 12 or less.

Examples of zeolites having a Constraint Index of from 1 to 12 include ZSM-5, ZSM-11, ZSM-12, ZSM-22, ZSM-23, ZSM-35, ZSM-38, and ZSM-48.

Exposing feed to the catalyst can be performed in any manner, such as exposing the cofeed to the catalyst under fluidized bed conditions, moving bed conditions, and/or in a riser reactor. In an aspect, the particle size of the catalyst can be selected in accordance with a fluidization regime used in the process. Particle size distribution is important for maintaining turbulent fluid bed conditions as described in U.S. Pat. No. 4,827,069. Suitable particle sizes and distributions for operation of dense fluid bed and transport bed reaction zones are described in U.S. Pat. Nos. 4,827,069 and 4,992,607. Particle sizes are normally in the range between about 10 microns and about 300 microns, or between about 20 microns and about 100 microns.

Acidic zeolite catalysts suitable for use as described herein can be those exhibiting high hydrogen transfer activity and having a zeolite structure of ZSM-5, ZSM-11, ZSM-12, ZSM-22, ZSM-23, ZSM-35, ZSM-48, MCM-22, MCM-36, MCM-49, MCM zeolite Y, and zeolite beta. Such catalysts can be capable of oligomerizing olefins from the cofeed. For example, such catalysts can convert $C_2$-$C_4$ paraffins to $C_{5+}$ hydrocarbons. Such catalysts are capable of converting organic sulfur compounds such as mercaptans to hydrogen sulfide without added hydrogen by utilizing hydrogen present in the cofeed. Group VIII metals such as nickel can be used as desulfurization promoters. The fluidized bed reactor/regenerator can maintain catalyst activity in comparison with a fixed-bed system. Further, the hydrogen sulfide produced in accordance with the processes described herein can be removed using conventional amine-based absorption processes.

While suitable zeolites having a coordinated metal oxide to silica molar ratio between about 20:1 and about 200:1 or higher can be used, it can be advantageous to employ aluminosilicate ZSM-5 having a silica:alumina molar ratio between about 25:1 and about 70:1, suitably modified. A typical zeolite catalyst component having Bronsted acid sites can comprise crystalline aluminosilicate having the structure of ZSM-5 zeolite with 5 to 95 wt. % silica, clay and/or alumina binder.

Siliceous zeolites can be employed as the catalyst in the present processes in acid form, ion-exchanged or impregnated with one or more suitable metals, such as Ga, Pd, Zn, Ni, Co, Mo, P, and/or other metals of Periodic Groups III to VIII. Zeolites can include other components, generally one or more metals of group IB, IIB, IIIB, VA, VIA or VIIIA of the Periodic Table (IUPAC).

Useful hydrogenation components can include noble metals of Group VIIIA, such as platinum, but other noble metals, such as palladium, gold, silver, rhenium or rhodium, can also be used. Base metal hydrogenation components can also be used, such as nickel, cobalt, molybdenum, tungsten, copper or zinc.

The catalyst can include two or more catalytic components and the components can be present in admixture or combined in a unitary multifunctional solid particle.

In addition to the aluminosilicates, the gallosilicate, ferrosilicate and "silicalite" materials can be employed. ZSM-5 zeolites are particularly useful in the present processes because of ability to regenerate, long life and stability under the extreme conditions of operation. Typically, the zeolite crystals have a crystal size between about 0.01 and over 2 microns or more, such as between about 0.02 microns and about 1 micron.

Catalyst particles can typically contain between about 25 wt. % and about 40 wt. % H-ZSM-5 zeolite, based on total catalyst weight, contained within a silica-alumina matrix. Typical Alpha values for the catalyst can be less than about 100. Sulfur conversion to hydrogen sulfide can increase as the alpha value increases. The Alpha Test is described in U.S. Pat. No. 3,354,078 Col. 8 1. 26-40 and Col. 9 1. 19-61, and in the Journal of Catalysis, Vol. 4, p. 527 (1965); Vol. 6, p. 278 (1966); and Vol. 61, p. 395 (1980), incorporated herein by reference.

In an aspect, exposure of the cofeed to the catalyst in accordance with the present processes described herein can deposit coke on the catalyst, causing its deactivation. Thus, part of the catalyst can be continuously or intermittently removed from the fluidized bed reactor and circulated to an oxidative regenerator, where coke is burnt from the catalyst. Additional fuel can be added to the oxidative regenerator to heat the catalyst to a required regeneration temperature.

Desulfurizing Acidic Catalysis

In an aspect, sulfur removal is accomplished by a desulfurizing acidic catalysis. Generally, the desulfurizing acidic catalysis comprises contacting the olefinic naphtha feed or cofeed, in the absence of added hydrogen, with an acidic catalyst to convert organic sulfur compounds to hydrogen sulfide. In an aspect, the desulfurizing acidic catalysis comprises contacting the olefinic naphtha feed or cofeed with the catalyst in the fluidized bed reactor of the present processes.

In an aspect, the olefinic naphtha feed or cofeed contacts a fluid bed of the acidic catalyst at a pressure between about 0 psig and about 400 psig, or between about 50 psig and about 250 psig, and at a temperature between about 700° F. and about 900° F., or between about 700° F. and about 850° F. for ZSM-5, ZSM-11, ZSM-22, ZSM-23, ZSM-35, and ZSM-48. The temperature range for MCM-22, MCM-36, MCM-49, zeolite Y, and zeolite beta is between about 400° F. and about 800° F. The WHSV of the olefinic naphtha feed or cofeed is between about 0.1 hr$^{-1}$ and about 10.0 hr$^{-1}$, or between about 0.1 hr$^{-1}$ and about 2.0 hr$^{-1}$.

In an aspect, the desulfurizing acidic catalysis produces a product having a significantly lower sulfur content than a feed. The sulfur content can be between about 5 weight parts per million (wppm) and about 50 wppm, or between about 10 wppm and about 30 wppm, or between about 15 wppm and about 20 wppm. Generally, majority of sulfur content in the feed is converted to H$_2$S.

Desulfurizing acidic catalysis is described in U.S. Pat. No. 5,482,617, Col. 3 1. 11 through Col. 5 1. 8, incorporated herein by reference.

Phosphorous Treatment of Catalyst

The ZSM-5 catalyst can be treated with phosphorous-containing compounds to slow dealumination, allowing for more active acid sites and thus higher catalytic activity. In an aspect, the ZSM-5 catalyst is treated with phosphorous-containing compounds comprising phosphonic, phosphinous, phosphorus, and phosphoric acids, salts and esters of such acids, and phosphorous halides.

Phosphorus treatments can be carried out by various techniques including slurry evaporation and wet incipient methods. In slurry evaporation, phosphorus can be incorporated into the catalyst by preparing an aqueous slurry of the zeolite and an aqueous solution of the phosphorus compound. Heating of the slurry can be used to facilitate treatment of the zeolite and evaporation of liquids. Heating of the slurry to temperatures of 70° C. and higher is suitable. The slurry can also be stirred or agitated during this step to ensure uniform treatment. Heating the zeolite slurry to near complete evaporation of the liquid causes the formation of dough which can be dried or calcined to form powder or chunks.

In the wet incipient method, an aqueous solution of the phosphorus compound is added, such as by spraying, to dry the zeolite without forming a slurry. Dry zeolite, which can be initially in the form of a powder, can be mixed with the phosphorus compound to form a dough. If necessary, water can be added to the mixture to facilitate formation of the zeolite dough. The dough can be dried or calcined to obtain the phosphorus-modified zeolite powder or particles.

Conversion Conditions

Conversion conditions for exposing the cofeed to a catalyst can include a temperature between about 775° F. and about 1200° F., or between about 800° F. and about 1175° F., or between about 850° F. and about 1150° F., or between about 900° F. and about 1100° F., or between about 950° F. and about 1050° F.; and a pressure between about 50 psig and about 500 psig, or a pressure between about 100 psig and about 350 psig, or a pressure between about 200 psig and about 300 psig; and a total hydrocarbon WHSV between about 2.0 hr$^{-1}$ and about 10 hr$^{-1}$, or between about 2.0 hr$^{-1}$ and about 5 hr$^{-1}$, or between about 3.0 hr$^{-1}$ and about 4.0 hr$^{-1}$. In one or more aspects, the conversion conditions can include a hydrocarbon WHSV of at least about 1.0 hr$^{-1}$, or at least about 2.0 hr$^{-1}$, or at least about 3.0 hr$^{-1}$, or at least about 4.0 hr$^{-1}$, or at least about 5.0 hr$^{-1}$, or at least about 8.0 hr$^{-1}$. Optionally, the total hydrocarbon WHSV can be about 4.0 hr$^{-1}$ to improve C$_{5+}$ yield.

In addition to a total cofeed WHSV, a WHSV can also be specified for the olefin compounds in the cofeed as an "olefin WHSV." The olefin WHSV represents a space velocity defined by just the weight of olefins in a feed relative to the weight of catalyst. As such, the conversion conditions include the olefin WHSV between about 0.8 hr$^{-1}$ and about 5 hr$^{-1}$, or between about 1.0 hr$^{-1}$ and about 4.0 hr$^{-1}$. An olefin WHSV between about 1 hr$^{-1}$ and about 2 hr$^{-1}$ has been shown by the data to be beneficial for increasing the C$_{5+}$ yield. In addition, temperatures of at least about 800° F. have been shown to increase the yield of C$_{5+}$ compounds, when the olefin WHSV is increased above 1 hr$^{-1}$.

Product

Exposing the cofeed (also referred to herein sometimes as the "combined feed" or the "feed") to the catalyst under conversion conditions described above produces a product having naphtha boiling range compounds with an improved octane content. The RON of the product can be greater than 100.

The naphtha boiling range compounds in the product include, but are not limited to, compounds with 5 or more carbon atoms (C$_{5+}$ compounds) typically in an amount of at least 1 wt. %, or higher than the C$_{5+}$ hydrocarbon content of the feed. In addition, the product includes C$_{5+}$ compounds in an amount of at least about 50 wt. %, at least about 55 wt. %, at least about 60 wt. %, at least about 65 wt. %, at least about 70 wt. %, or at least about 75 wt. % of the total product. Further, C$_{5+}$ hydrocarbon in the product has an aromatic content of greater than about 55 wt. %, greater than about 65 wt. %, greater than about 70 wt. %, or greater than about 75 wt. % of the C$_{5+}$ hydrocarbon. Moreover, the product can have a reduced sulfur content compared to the cofeed. The sulfur content of the product can be less than about 50%, less than about 75% and less than about 90% of the feed.

C$_2$-C$_4$ content of the feed that did not convert in the fluidized bed reactor can be recovered in a recovery unit.

Various separated fractions include light hydrocarbons such as unconverted light paraffins, e.g., $C_2$-$C_5$ paraffins (ethane, propane, isobutane/linear butane and pentanes), and light olefins, e.g., $C_2$-$C_4$ olefins (propene, ethylene, propylene, and butylene), each or combined can be recycled to the fluidized bed reactor.

The features of the invention are described in the following non-limiting examples.

EXAMPLE

Olefinic naphtha and light paraffins were fed as the combined feed to a catalytic fluidized bed reactor comprising P/ZSM-5 catalyst yielding a product comprising nearly 70 wt. % $C_{5+}$ hydrocarbon having an increased RON. The conversion conditions included cofeeding the streams at an olefin WHSV of about 1.1 $hr^{-1}$ and operating at a reaction temperature of about 900° F. and a reaction pressure of about 300 psig. Table 1 below provides the composition of the cofeed and product:

TABLE 1

| Composition of Cofeed (Combined Feed) and Product | | |
|---|---|---|
| Temperature, ° F. | 900 | |
| Pressure, psig | 300 | |
| Olefin WHSV, $h^{-1}$ | 1.1 | |
| Catalyst | P/ZSM-5 | |
| Product yields (Normalized to 100) | Cofeed | Product |
| $C_{2-}$ and Coke, wt. % | 2.1 | 2.7 |
| Paraffinic $C_3$-$C_4$, wt. % | 41.1 | 25.6 |
| Olefinic $C_3$-$C_4$, wt. % | 8.1 | 2 |
| Naphtha ($C_{5+}$), wt. % | 48.7 | 69.7 |
| $C_{5+}$ Properties (Raw liquid adjusted) | | |
| Aromatics | 21.1 | 77.4 |
| RON (calc. $C_{5+}$ to 430° F.) | 85.7 | 102.3 |
| ΔRON (calc. $C_{5+}$ to 430° F.) | | 16.6 |

As shown by the above data, in the product, $C_{5+}$ yield increased from 48.7 to 69.7 wt. %, or a 21 wt. % increase of naphtha. In addition, there was a three-fold increase in the aromatics as well as a diminished percentage of paraffinic $C_3$-$C_4$ in the product. Additionally, the present process provided the product having an increase in the RON of about 17.

The invention claimed is:

1. A process for producing a high octane reformate comprising the step of providing a cofeed of olefinic naphtha and light paraffins as a combined single feed to a catalytic fluidized bed reactor maintained at a temperature between about 775° F. and about 1250° F. and an operating pressure between about 10 psig and about 500 psig, wherein the cofeed comprises $C_{5+}$ hydrocarbon in an amount between about 40 wt. % and about 60 wt. % and light paraffins in an amount of less than 50 wt. % to produce the high octane reformate having $C_{5+}$ hydrocarbons in an amount of at least about 20 wt. % greater than the amount of $C_{5+}$ hydrocarbons in the cofeed and aromatics in an amount of at least 55 wt. %.

2. The process of claim 1, wherein the olefinic naphtha comprises $C_4$ to $C_{12}$ hydrocarbons.

3. The process of claim 1, wherein the light paraffins comprise $C_2$ to $C_5$ hydrocarbons.

4. The process of claim 1, wherein the high octane reformate further comprises less than 1.0 wt. % coke.

5. The process of claim 1, wherein the high octane reformate further comprises less than 3.0 wt. % $C_2$-hydrocarbons.

6. The process of claim 1, wherein the high octane reformate comprises between about 15 wt. % and 20 wt. % saturated hydrocarbons.

7. The process of claim 1, wherein the high octane reformate comprises less than 10 wt. % iso-paraffin and naphthene.

8. The process of claim 1, wherein the high octane reformate comprises less than 5.0 wt. % light paraffins.

9. The process of claim 1, wherein the cofeed further comprises between about 0.5 wt. % and about 5 wt. % unsaturated hydrocarbons.

10. The process of claim 1, wherein the reactor has an operating pressure between about 150 psig and about 300 psig.

11. The process of claim 1, wherein the reactor has an operating temperature between about 850° F. and about 1000° F.

12. The process of claim 1, wherein the aromatics comprise benzene, toluene, and xylene.

13. The process of claim 1, wherein the catalytic fluidized bed reactor comprises a zeolite catalyst.

14. The process of claim 1, wherein the olefinic naphtha is fed to the reactor at a hydrocarbon weight hourly space velocity (HC WHSV) between about 3.0 $hr^{-1}$ and about 5.0 $hr^{-1}$.

15. The process of claim 1, wherein the high octane reformate has a RON of 100 or greater.

16. The process of claim 1, wherein the high octane reformate has a specific gravity between about 0.795 and about 0.800.

17. The process of claim 1, wherein the high octane reformate has less than 55 wt. % sulfur.

18. The process of claim 1, wherein the olefinic naphtha is isolated from an FCC process, a coker process, or a steam cracking process.

19. The process of claim 1, further comprising the step of converting light olefins to extinction.

20. The process of claim 1, wherein the catalytic fluidized bed reactor comprises a ZSM-5 catalyst.

21. The process of claim 20, wherein the ZSM-5 catalyst is phosphorus-treated.

22. The process of claim 1, wherein the high octane reformate comprises propane, isobutane and butane.

23. The process of claim 1, wherein the high octane reformate comprises propylene and butene.

* * * * *